Figures 1, 2, 3, 4:
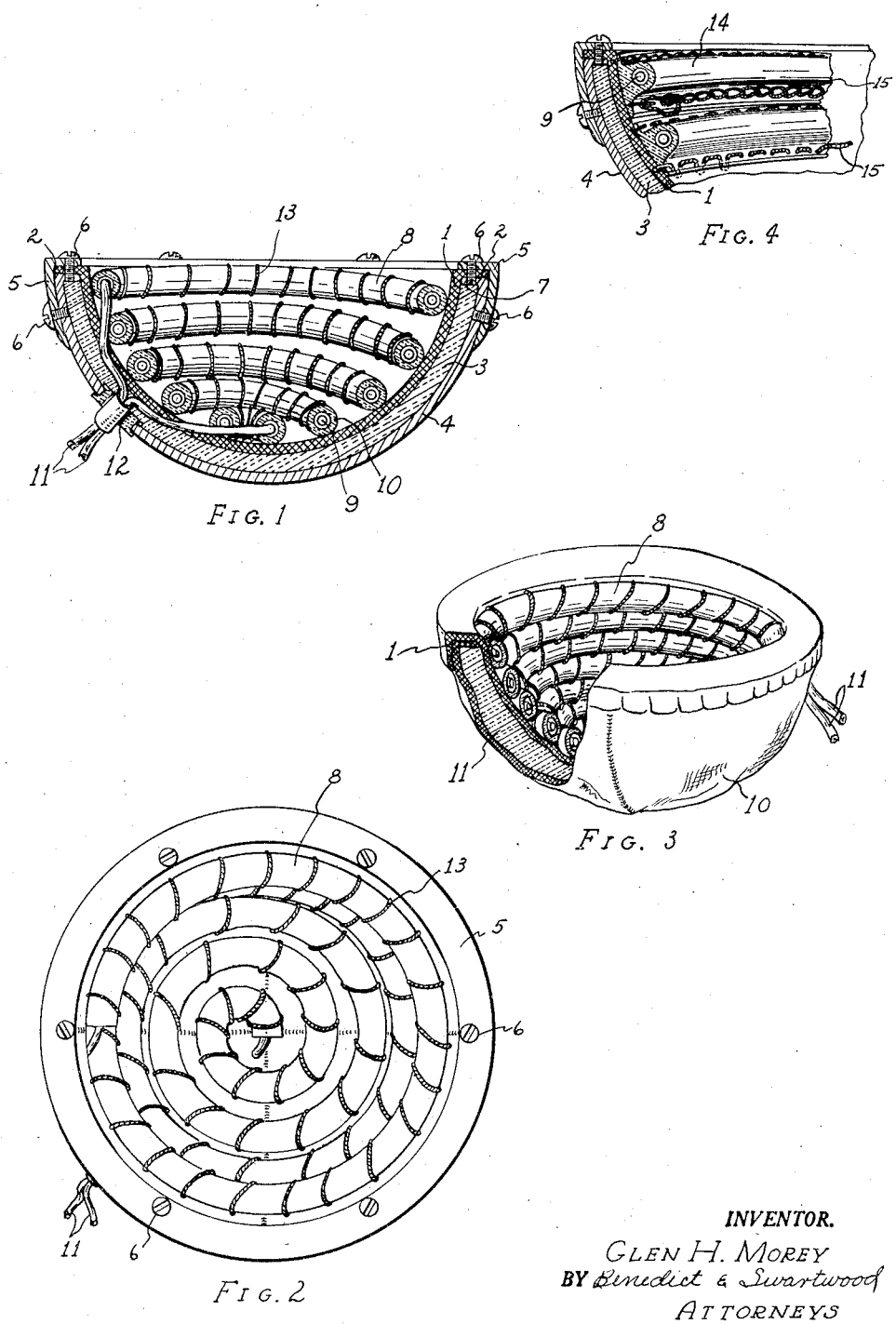

Jan. 31, 1950  G. H. MOREY  2,496,012
ELECTRICAL HEATER AND METHOD OF MANUFACTURING IT
Filed July 5, 1946

INVENTOR.
GLEN H. MOREY
BY Benedict & Swartwood
ATTORNEYS

Patented Jan. 31, 1950

2,496,012

UNITED STATES PATENT OFFICE 2,496,012

ELECTRICAL HEATER AND METHOD OF MANUFACTURING IT

Glen H. Morey, Terre Haute, Ind.

Application July 5, 1946, Serial No. 681,558

1 Claim. (Cl. 219—43)

This invention relates to an electrical heater and a method of manufacturing it. More particularly, it relates to a heater for articles which conforms in size and shape to the outline of the article to be heated and to an approved method of attaching the heating element to an article-receiving pocket shaped to conform to the outline of the article to be heated, said element being spaced in a desired predetermined manner for heating the article.

While my heater particularly relates to an electrical heating apparatus for materials constructed of glass, metal, earthenware or the like, it also relates to a sectional heater that can be made to conform to the outline of any shaped article to be heated so that heat may be uniformly applied.

I provide a heater which can be "tailor-made" to fit any type of article to be heated and at the same time have the heating element so attached to the device that it is readily accessible for replacement in case it burns out or otherwise becomes damaged.

It is, therefore, an object of this invention to provide a heating element made to conform to articles of complex structure. It is a further object to provide a method of manufacturing such a heater. Another important object of the invention is to provide a method of attaching a resistance heating element onto an article receiving pocket in which the heating element, properly insulated is readily accessible for replacement.

A broad embodiment of my invention comprises an inner jacket, preferably of a fireproof fabric, shaped to conform to the size and shape of the article to be heated, an outer jacket which may be metal or fabric with insulating material in between the inner and outer jackets. The heating element properly insulated is sewed or otherwise attached to the inner jacket and the heating element is arranged in a predetermined configuration such as a helical form around the inner periphery of the inner jacket. Broadly, the heater is made by first making a refractory support having an inner jacket fabric lining which is shaped to the size and form of the vessel or article to be heated and then the insulated heating element is sewed or otherwise attached to the fabric lining.

In a specific embodiment the invention comprises a heater having a metallic supporting structure, an inner heat resistant fabric lining, hardened refractory therebetween, with an insulated heating element attached to the inner liner.

The heater of this invention has the advantage that it can be made to conform to the outline of an article to be heated so that heat may be uniformly applied. It has the further advantage that it can be made in sections conforming to the various parts of an irregularly shaped object and the parts can be assembled around the object after it is in place. For example, a valve may be installed in a line and a heater which is in two or more sections may be applied to cover it except for the connecting lines and valve stem. This takes care of a difficult problem encountered where lines must be kept hot or else they will freeze.

Another advantage is that the heating element by being readily attached and detached may be arranged differently for different types of heating. For example, in heating a flask wherein refluxing in the upper portion of the flask must be avoided, most of the heating element may be placed near the bottom of the heater and just a small part of the heating element placed near the top, primarily to take care of heat losses.

The method of manufacture has the advantage that heaters can be made which could not be made before. By my method irregularly shaped heaters to be placed in or around articles of complementary shape can be supplied. Heretofore, this could not be done, at least by any practical method. The heaters can be made in sections and the sections connected in series or in parallel to heat the object. The method permits the manufacturer to space the element in any desired way so as to put more or less heat into any given part of the heater to be heated depending on special needs.

Another advantage of having an insulated heating element attached to the inner fabric liner rather than embedded in a refractory material is that the heating element is sufficiently removed from the refractory material that an air space is provided which keeps the refractory material at a lower temperature and thus prevents cracking or crumbling of the refractory, especially at high operating temperatures.

Other advantages, objects and uses of my invention will become apparent by referring to the drawings in which Fig. 1 is a cross sectional view of my heater employing a rigid refractory material. Fig. 2 is a plan view of the heater of Fig. 1. Fig. 3 is a modification of my invention using a soft pliable refractory enclosed between two sections of fireproof material, one of said sections forming an inner pocket and the other of said sections forming the exterior of the heater. Fig. 4 is a modification of Fig. 1 showing an asbestos strip sewed to the inner liner and covering the heating element.

Referring to Fig. 1, 1 represents a fabric liner for the heater. This liner may be made of fireproof material such as asbestos fabric, glass fabric and the like. The inner liner 1 is shaped to fit the vessel or article to be heated by stretching over a form, taking tucks or making darts in the fabric or cutting a multi-lobed pattern which on sewing together will form the desired shape. The fabric liner 1 is preferably cut in such a manner as to provide an outwardly extending annular lip 2 at the periphery of the vessel receiving opening of the fabric liner member 1.

It is to be understood that while I have described Fig. 1 in connection with its use for a vessel such as a glass or metal flask, it has many other uses and may be built in any shape that can be formed.

The use of a fireproof, non-combustible fabric 1 has the advantage of partially insulating the heater, protecting the refractory against chipping or cracking and also serving to cushion the article which is important from the breakage standpoint when applied to glass or earthenware vessels.

After the fabric liner 1 is formed around a form, or the article to be heated, a refractory cement, such as an asbestos cement or other plastic or molded material which will harden into a non-conducting heat resistant rigid support, is then molded around the fabric 1. This may be done by placing a predetermined amount of the cement 3 around the form to the desired thickness and then allowing the cement to set or harden. Heating may be used to assist in the drying of the cement. The cement should be of such consistency that once it has been molded to the desired shape it will hold until it sets. To assist in the molding operation a pattern may be made having the shape of the heating unit itself and the fabric 1 may be stretched around it, and the refractory being molded to the outside.

After the cement 3 has set, forming a rigid refractory support, it is placed within the outer metal jacket 4 which may be stamped or molded in any suitable manner and preferably it is made to conform to the general shape of the inner fabric 1. An annular metal L-shaped ring 5 is provided which overlaps somewhat the exterior portion of the outer metal jacket 4. The metal ring 5 is attached to the outer metal jacket 4 by means of the screws 6. The inner fabric 1 has its lip portion 2 placed between the annular lip 7 which is part of the outer member 4 and the annular metal ring 5 and is thereby held in place.

A metallic resistance heating element 8 is provided which may be arranged around the interior of the heater in helical form as is best shown in Fig. 2. The heating element 8 need not necessarily be arranged in helical form. It should be arranged in a predetermined configuration around the inner periphery of the liner 1 so as to impart heat at the places desired. It may merely go back and forth across the inner periphery of the inner liner having more of the element at some places than others in order to impart more heat in some places. The heating element 8 comprises a resistance wire element 9 and an insulated covering 10. The wire in the heating element is encased in a suitable insulating material such as asbestos and such an insulated wire can be readily purchased on the market. The leads 11 to the heating element extend through the insulated opening 12 in the heater. The insulated heating element 8 may be sewed to the fabric 1 by placing a thread 13 on either side and around the element and through the fabric. The heating element 8 should be arranged so that the turns and spacing are such that no section of the heating element will rub another when the entire heating element is placed in heating position around a vessel or article. This is especially true for the flexible heater shown in Figure 3.

The heating element 8 may comprise a bare wire 9 or the wire 9 may be purchased with the usual insulating material around it. However the usual insulating material will not stand up at high temperatures. I have found that asbestos fabric will stand up. Therefore the material 10 may comprise an asbestos sleeve which is slipped over the heating wire 9 and the sleeve 10 attached to the inner periphery of the inner liner 1.

Referring to Figure 4, instead of an asbestos sleeve, a continuous strip of asbestos 14 may be provided which partially surrounds the wire 9. The asbestos strip may be attached by the fireproof threads 15. In this case the threads 15 do not pass around the element 9 as in Figures 1, 2 and 3, but merely pass through the asbestos strip 14 and partially into and out of the inner liner 1. This method is particularly advantageous when using a hard refractory insulating material 3 as in Figure 1. One of the big advantages of my invention is to be able to replace all or any part of the heating element without completely rebuilding the heater. While it is easy to assemble the heater shown in Figure 1 it is easier to replace the heating element using the device of Figure 4. The asbestos strip 14 can be readily detached by breaking the threads 15. It can be reattached after repairs by stitching as shown in Figure 4 where the stitching does not have to extend completely through the inner liner 1 or passed entirely around the heating element as in Figure 1.

If desired, the structure of Figs. 1 and 2 can be modified by placing another insulating material which may also be of fabric between the hard refractory material 3 and the metal support 4 which provides additional insulation for the heater.

In the modification of Fig. 3 the inner fabric 1 is cut and made in the same manner as the inner fabric 1 for Fig. 1. The heating element 8 is attached to the fabric 1 in the same manner as described for Fig. 1. In the modification of Fig. 3 the exterior 10 is also of a heat resistant fabric and is precut and formed similar to the manner for forming the inner liner 1. In between the inner liner 1 and the outer support 10 is placed a resilient heat insulating material 11 which may comprise asbestos fibres, glass wool, slag wool "85% magnesia" in comminuted form or other suitable materials. The material 11 may be suitably packed, matted or filled into a substantial uniform cushion to provide resilient support for the inner liner 1. The inner liner 1 is sewed to the outer fabric 10 after the resilient insulating material 11 is in place.

Another advantage of having the heating element 8 arranged as I have illustrated and described, rather than embedding it in the refractory material itself, especially for a hard refractory, is that the refractory material 3, for example in Fig. 1, is not so likely to crack on long continuous heating because the heating element itself is spaced somewhat from the refractory material by the insulating material around the heating wire and a dead air space is provided between the refractory material 3 and the vessel or article being heated. Thus, a heater of this type has a much longer life than those previously made. Also the insulated wire itself provides a means for absorbing the shock when a glass vessel is placed in the heater, which also tends to prevent breakage.

I have described above but one specific example of the many which come within the scope of my invention. My device can be made such that it requires no skilled help other than a seamstress to cut or sew the envelope or jacket in the proper shape and then to sew the heating element to it. Semi-skilled labor can be used to form the refractory heating unit or in some instances this can be done by machinery. The heating units may be made in sections so as to conform to the outline of the portions of the article to be heated and to facilitate its application. These sections can be made in such a manner that they can be fastened together before or after being applied. Each unit may be incorporated in an insulated supporting structure if desired which may be joined around the article to form a complete heater. Furthermore, although these heaters are particularly adapted to heat the outside of articles they may also be used to heat the inside. In this case the fabric 1 may be sewed into the desired shape, turned wrong side out and the heating element 8 sewed to it. It is then turned right side out and the plastic refractory 3 applied to the inside. The fabric in this case is on the outside and will rest against the inner surface of the vessel. Heaters for concave surfaces may be made in a similar manner.

I claim as my invention:

In a heating mantle, shaped to conform to an article to be heated, comprising a flexible inner fabric liner, an outer supporting layer, and insulating material therebetween, the improvement which comprises a flexibly insulated electrical resistance heating element, said element being arranged in spaced turns, and means for attaching said element to the inner periphery of the liner without interweaving the element in the fabric of the liner, the turns being arranged in such a manner that the article to be heated will rest directly on the element and be spaced away from said inner liner leaving a dead air space between the turns of the element, and the inner liner and the article.

GLEN H. MOREY.

REFERENCES CITED

The following references are of record in the file of this patent:

UNITED STATES PATENTS

| Number | Name | Date |
| --- | --- | --- |
| 1,492,146 | Thornton, Jr. | Apr. 29, 1924 |
| 1,492,821 | Weinbach | May 6, 1924 |
| 1,657,479 | MacFarland | Jan. 31, 1928 |
| 2,282,078 | Morey | May 5, 1942 |
| 2,412,843 | Spraragen | Dec. 17, 1946 |
| 2,419,848 | Morey | Apr. 29, 1947 |